United States Patent
Kroulik et al.

(10) Patent No.: US 9,865,372 B2
(45) Date of Patent: Jan. 9, 2018

(54) DEFLECTION CONTAINING ELECTRICAL CONDUCTOR

(71) Applicant: FLEX-CABLE, Howard City, MI (US)

(72) Inventors: Erwin Kroulik, Edmore, MI (US); Timothy J. Jones, Big Rapids, MI (US)

(73) Assignee: FLEX-CABLE, Howard City, MI (US)

( * ) Notice: Subject to any disclaimer, the term of this patent is extended or adjusted under 35 U.S.C. 154(b) by 408 days.

(21) Appl. No.: 14/616,434

(22) Filed: Feb. 6, 2015

(65) Prior Publication Data

US 2016/0233004 A1  Aug. 11, 2016
US 2017/0194071 A9  Jul. 6, 2017

Related U.S. Application Data

(63) Continuation of application No. 12/943,560, filed on Nov. 10, 2010, now Pat. No. 8,952,565.

(51) Int. Cl.
| | | |
|---|---|---|
| *H02H 7/18* | (2006.01) | |
| *H01B 5/02* | (2006.01) | |
| *B60L 11/18* | (2006.01) | |

(52) U.S. Cl.
CPC ............... *H01B 5/02* (2013.01); *B60L 11/18* (2013.01)

(58) Field of Classification Search
CPC .................................. H01B 5/02; B60L 11/18
USPC ....................................................... 307/10.7
See application file for complete search history.

(56) References Cited

U.S. PATENT DOCUMENTS

| | | |
|---|---|---|
| 5,486,652 A | 1/1996 | Kasper |
| 8,114,540 B2 | 2/2012 | Trester et al. |
| 2008/0308292 A1 | 12/2008 | Okushita et al. |
| 2010/0012345 A1 | 1/2010 | Kumar et al. |
| 2012/0112527 A1 | 5/2012 | Kroulik et al. |

FOREIGN PATENT DOCUMENTS

| | | |
|---|---|---|
| CN | 201222633 | 4/2009 |
| EP | 1509982 A1 | 3/2005 |
| JP | 10302548 A | 11/1998 |
| JP | 11067184 A | 3/1999 |
| JP | 11250950 A | 9/1999 |
| JP | 2000149667 A | 5/2000 |
| JP | 2000285986 A | 10/2000 |
| JP | 2000299912 A | 10/2000 |
| JP | 2003092025 A | 3/2003 |
| JP | 2003235137 A | 8/2003 |
| JP | 2006042468 A | 2/2006 |
| JP | 2009064635 A | 3/2009 |
| KR | 1020100054626 A | 5/2010 |

*Primary Examiner* — Carlos Amaya
(74) *Attorney, Agent, or Firm* — Avery N. Goldstein; Blue Filament Law PLLC

(57) ABSTRACT

An electrical conductor is provided that includes at least one strip of conductive material defining a length and having a first end with a first cutout and a second end having a second cutout. The cutouts engage electrical terminals. The at least two deflections are orthogonal to the length of the strip. The deflections are located between the first cutout and the second cutout and are in plane or out of plane of the cutouts. The electrical conductor is particularly well suited for interconnection of batteries associated with a vehicle power system.

17 Claims, 2 Drawing Sheets

DEFLECTION CONTAINING ELECTRICAL CONDUCTOR

RELATED APPLICATIONS

This application is a continuation application of and claims priority benefit to U.S. Non-provisional application Ser. No. 12/943,560 filed Nov. 10, 2010; now U.S. Pat. No. 8,952,565 issued Feb. 10, 2015; the contents of which are hereby incorporated by record.

FIELD OF THE INVENTION

The present invention in general relates to an electrical conductor and in particular to an electrical conductor having multiple deflections.

BACKGROUND OF THE INVENTION

The principal role of an electrical conductor is to provide electrical communication between conductor terminals. Electrical conductors that communicate large amperages require larger cross-sectional areas that make the resultant electrical conductor less flexible. When a thick gauge electrical connector is subjected to vibration, the terminal contacts created by the connector are degraded thereby lowering conductivity through the system and leading to premature failure of terminal contacts. These problems are particularly pronounced when the electrical connector is associated with a vehicle or other highly vibratory uses. Conventional electrical connectors have taken the form of either metallic bars or wires. Neither of these has been wholly satisfactory on the basis that the latter while providing high transmission current densities is also inflexible and tends to suffer more rapid vibration induced terminal connector failure while the latter has opposite attributes relative to a strip electrical connector.

SUMMARY OF THE INVENTION

An electrical conductor is provided that includes at least one strip of conductive material defining a length and having a first end with a first cutout and a second end having a second cutout. The cutouts engage electrical terminals. Multiple strips are optionally used to form a stack and are bent to include at least two deflections orthogonal to the length of the strip with the deflections being in the same direction and separated by a trough. The deflections are readily provided within the plane defined by the cutouts or extend above the plane. The deflections are located between the first cutout and the second cutout. An electrical conductor is also provided that includes at least three arms with cutouts or other forms for engaging electrical terminals. The multiple arm embodiment includes at least two deflections on a single arm. The electrical conductor is particularly well suited for interconnection of batteries associated with a vehicle power system.

DETAILED DESCRIPTION OF THE PREFERRED EMBODIMENTS

The present invention has utility as an electrical conductor. An inventive conductor is particularly well suited to operate in an environment associated with an electric or hybrid vehicle. Particularly beneficial features of an inventive conductor include multiple vibration damping deflections orthogonal to the conductor length. While it is appreciated that the inclusion of at least two deflections orthogonal to the length of a conductor or conductor segment increases the height profile of the conductor, the ability of an inventive conductor to damp vibrations and thereby prolong electrical performance has been found to be a worthwhile tradeoff in spite of the convention that minimal profile electrical conductors are desirous in the confined volumes of electric or hybrid vehicle power systems. It is appreciated that the deflections are readily provided in plane while orthogonal to a conductor length as measured in the direction between cutouts. Preferably, an inventive electrical conductor is formed of layers of sheet material that are bonded together with layers of lower melting temperature material and subsequently deformed from a planar laminar form into an inventive electrical conductor with at least two deflections along the linear portion.

Figure 1:
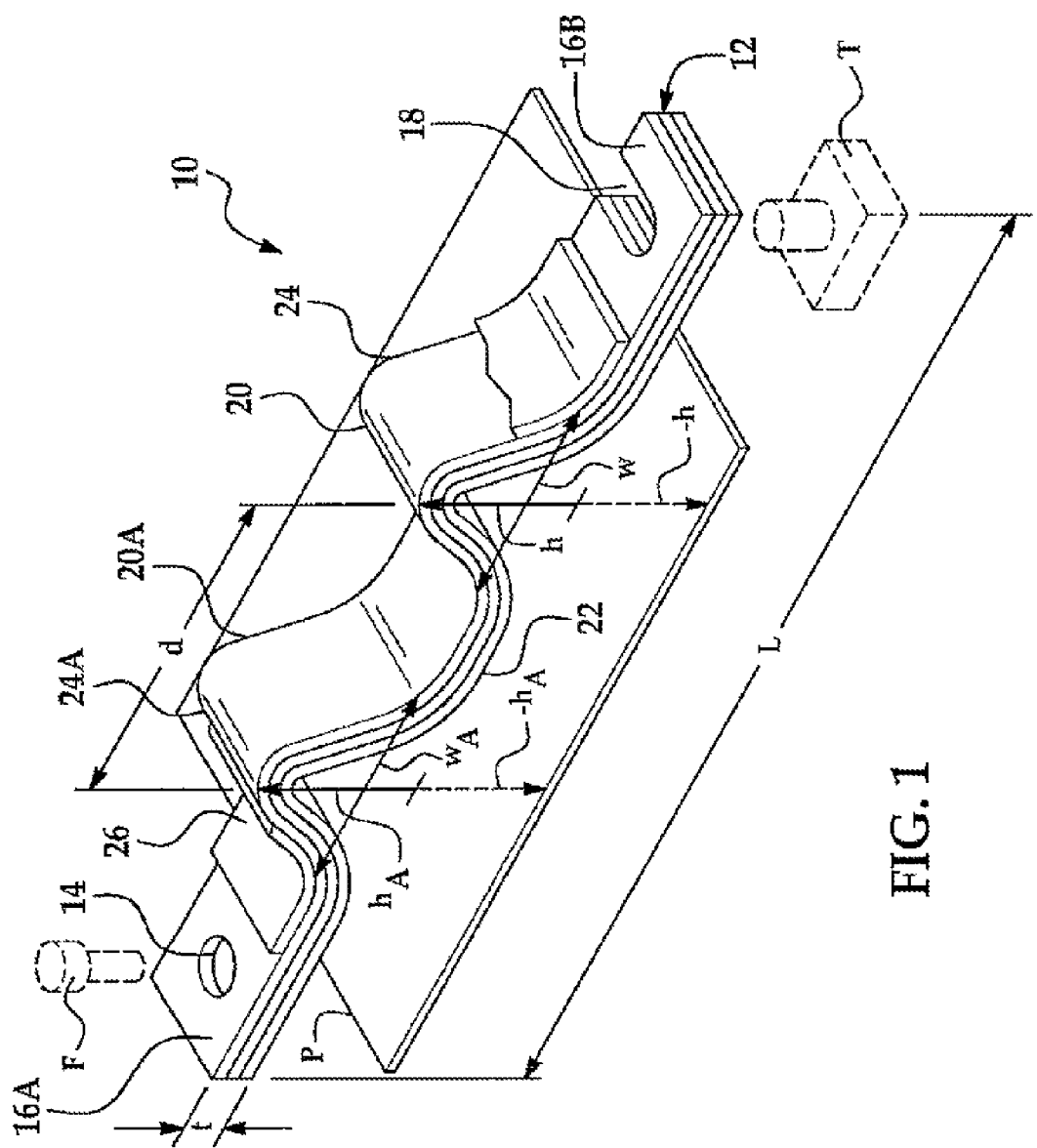
FIG. 1 is a perspective view of an inventive dual end deflection containing electrical conductor.

An inventive electrical conductor is shown generally at 10 in FIG. 1. The conductor 10 has ends 16A and 16B. The ends 16A and 16B are each adapted to engage an extrinsic electrical terminal T to provide an electrical conduction path therebetween. It is appreciated that an end 16A or 16B is amenable to functioning as an electrical contact with an electrical terminal T through a clamp that engages the thickness of the conductor 10 proximal to the end 16A or 16B. Alternatively, an end portion 16A or 16B has a hole 14 or a notch 18 through the thickness of the conductor 10 that is adapted to engage an electrical terminal T or otherwise form a high surface area electrical contact with the electrical terminal T through insertion of a fastener F or other conventional component to the hole 14 or notch 18 and into electrical communication with the terminal T. It is appreciated that the presence, dimensions, and shape of a hole 14 or notch 18 in one end of an inventive conductor 10 is wholly independent from those present in another end of the conductor 10. By way of example, a hole is circular, oblong, or of a polygonal cross-sectional shape. As used herein, holes and notches are collectively and synonymously referred to generically as cutouts. The conductive material strip 12 is deformed to include at least two deflections 20 between the end portions 16A and 16B and preferably bounded by cutouts. The deflections 20 are formed orthogonal to a long axis of the strip 12 that as shown in FIG. 1 corresponds to the length of the conductor 10. According to the present invention, placement of at least two deflections 20 in the same direction relative to the length of a conductor 10 creates a vibrational damping structure within the conductor 10 that enhances operational performance of an inventive conductor relative to an otherwise identical length planar conductor. Optionally, a third, fourth, or fifth additional deflection is added to the vibrational damping structure formed by deflections. Optionally, the trough 22 intermediate between deflections 20 is vertically displaced anywhere between deflection apices 24 defined by height h and an opposing vector −h extending below plane P defined by ends 16A and 16B. Preferably, the trough 22 has a minimal value of between 0 and 0.8 h. The height h of a deflection 20 is typically between 2.5 and 5 times the thickness, t. Preferably, a deflection 20 has a height h of between 3 and 4 times the thickness t. While a deflection 20 can assume a variety of shapes illustratively including a sine wave, triangle wave, square wave, and asymmetric forms of any of the aforementioned shapes, preferably a deflection 20 has a shape variant of the aforementioned that has a continuous curvature as sharp angular changes in direction in a conductive metal strip have been shown to compromise the current carrying capacities of a resultant electrical conductor. Preferably, a deflection 20 is a smoothly changing curve approximated by a simple expression such as a sine, Gaussian, or Poisson expression. The deflection 20 has a full width half max that is between 2.5t and 5t, where t denotes the thickness of strip or strips 12.

Deflection 20A has a height $h_A$ and a full width half max $w_A$ for which the above descriptions with respect to deflection 20 are equally applicable thereto. Preferably, $h_A$ is between 90 and 110 percent of h. $w_A$ is preferably between 90 and 110 percent of w. The spacing between apices 24 and 24A is denoted as "d" and is typically between 2.5 and 5 times the thickness t. Preferably, d is between 0.7 w and 1.3 w. The surface portions of the strip 12 intermediate between ends 16A and 16B are optionally covered with a polymeric electrical insulator 26.

An optional insulator 26 is depicted only on a top surface of the cutaway view and there in partial cutaway view for visual clarity. In usage, a circumferential coating of an insulator 26 is optionally present. Polymeric electrical insulators operative herein illustratively include thermoplastic elastomers (TPE), thermoplastic vulcanizates (TPV), poly vinyl chloride (PVC), polytetrafluoroethylene, silicone, polyolefin, neoprene, and varnish. An inventive electrical conductor 10 is optionally formed without a sheath surrounding the end portion 16A and also without a grommet, rivet, or ferrule surrounding a hole 14 or notch 18 formed in end 16A or 16B.

A strip 12 is chosen on a basis of electrical conductivity properties as well as operational longevity in the environment in which a given inventive electrical conductor 10 is applied. Representative material suitable for the formation of a conductive strip 12 illustratively include copper, aluminum, iron, silver, and alloys thereof; steel; intermetallics; superconductors; pnictides, alloys thereof, and laminate thereof. Copper and copper alloys represent preferred compositions for a strip 12. More preferably, half hard and spring tempered copper and copper alloys are used to form a strip 12, and in particular for a conductor 10 operative in a vehicle application. It is appreciated that construction of an electrical conductor 10 according to the present invention is amenable to joinder of multiple metal strips 12 to form a superimposed stack. The details of forming a conductor 10 from a stack of strips 12 are detailed in copending U.S. patent application Ser. No. 12/569,080 and in particular paragraphs [0011]-[0017] thereof. A typical thickness t of a single strip of a stack of such strips is between 0.25 and 6.8 millimeters.

Optionally, a third, fourth, or fifth additional deflection is added to the vibrational damping structure formed by deflections. Optionally, the trough 22 intermediate between deflections 20 is vertically displaced anywhere between deflection apices 24 defined by height h and an opposing vector –h extending below plane P defined by ends 16A and 16B. Preferably, the trough 22 has a minimal value of between 0 and 0.8 h. The height h of a deflection 20 is typically between 2.5 and 5 times the thickness, t. Preferably, a deflection 20 has a height h of between 3 and 4 times the thickness t. Deflection 20A has a height $h_A$ and a full width half max $w_A$ for which the above descriptions with respect to deflection 20 are equally applicable thereto. Preferably, $h_A$ is between 90 and 110 percent of h. $w_A$ is preferably between 90 and 110 percent of w. The spacing between apices 24 and 24A is denoted as "d" and is typically between 2.5 and 5 times the thickness t.

Figure 2:
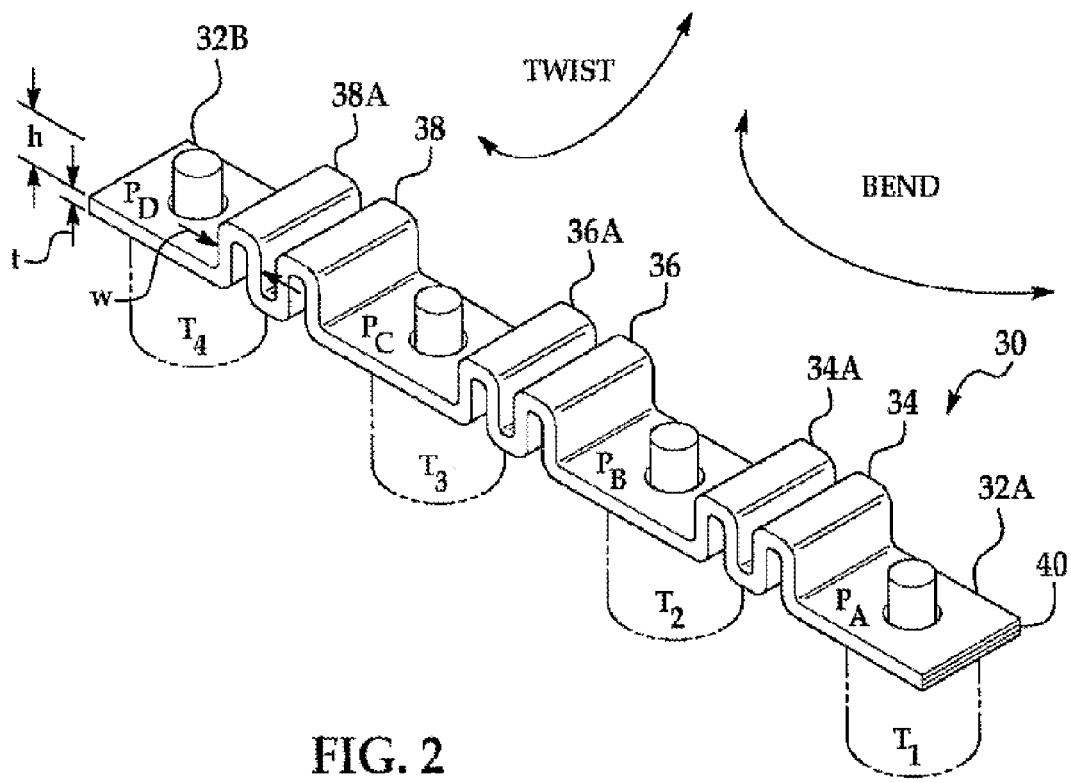
FIG. 2 is a perspective view of an inventive multiple terminal deflection containing electrical conductor.

Referring now to FIG. 2 a multi-terminal engaging inventive conductor is shown generally at 30. The conductor 30 is formed as detailed above with respect to FIG. 1. The conductor 30 has ends 32A and 32B. Base surfaces define planes $P_A$-$P_D$ with at least two such planes engaging terminals $T_1$, $T_2$, $T_3$, or $T_4$. At least one set of deflections 34-34A, 36-36A, and 38-38A are provided between adjacent planes $P_A$-$P_B$, $P_B$-$P_C$, or $P_C$-$P_D$. It is appreciated that planes $P_A$, $P_B$ and $P_C$ need not be parallel with one another. Each of these deflections has the properties ascribed above with respect to deflections 20 and 20A and include apices, deflection height, and deflection width properties that are also detailed above with respect to such properties in FIG. 1. It should be appreciated that each of the other deflections is also characterized by a deflection height and full width half max characterization, as well as a deflection shape, all of which are detailed above with respect to FIG. 1. As detailed above with respect to FIG. 1, it is appreciated and indeed preferred that a conductor 30 be formed from multiple strips 40 that are superimposed and formed into a unitary structure, as detailed above with respect to FIG. 1. A strip 40 and multiple such strips that are combined to form the conductor 30 are readily formed from the materials detailed above with respect to strip 12 of FIG. 1. For visual clarity, an insulation layer is not depicted. As shown in FIG. 2, the inventive conductor is well suited to absorb stresses associated with terminal misalignment and dynamic bend and twist as experienced by a vehicle battery assembly.

Figure 3:
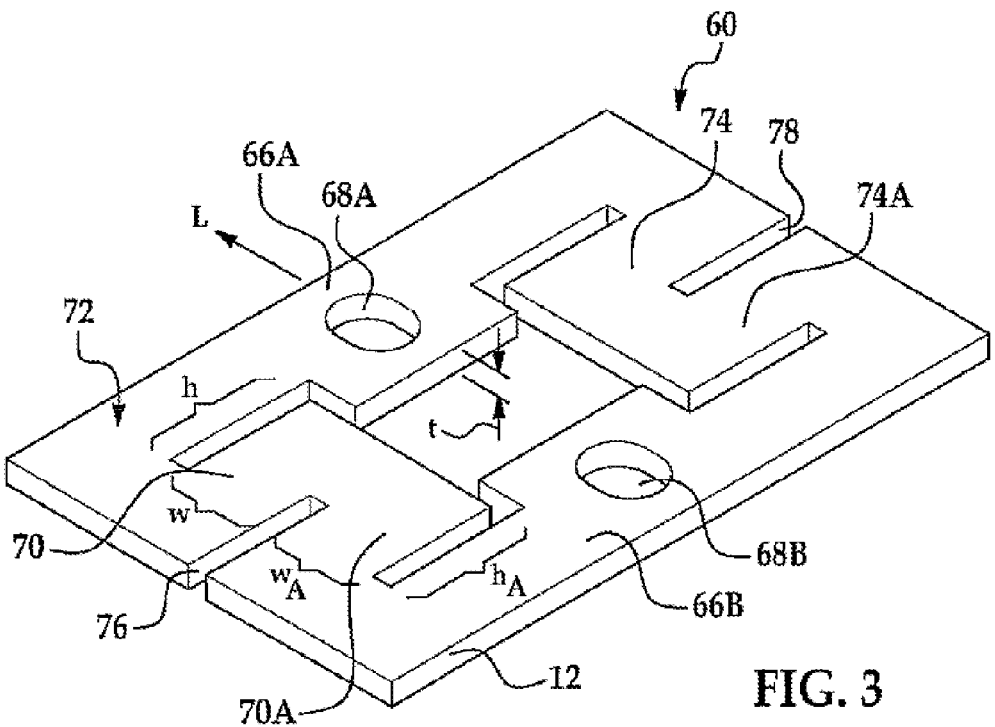
FIG. 3 is a perspective view of an inventive planar dual end deflection containing electrical conductor.

FIG. 3 is a perspective view of a planar embodiment of an inventive conductor that is shown generally at 60. Ends 66A and 66B each have a hole 68A and 68B, respectively, or a notch as shown at 18 in FIG. 1 for engaging an electrical terminal. Preferably, the holes 68A and/or 68B are oblong. The conductor 60 is formed from a single strip 12 or stacks thereof as detailed above. Planar deflections 70 and 70A are formed orthogonal to L and in the plane or surface defined by face 72. A similar pair of deflections 74 and 74A are provided to bound the axis 68A-68B. Deflection pairs 70-70A and 74-74A are separated by troughs 76 and 78, respectively.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:
1. An electrical conductor comprising: a plurality of joined strips of conductive material defining a thickness and having a first end with a first cutout and a second end with a second cutout, said plurality of joined strips including at least two sinusoidal wave deflections being between the first cutout and the second cutout, said plurality of joined strips forming a superimposed stack, a single strip of said stack having a thickness between 0.25 and 6.8 millimeters, said at least two deflections are in a same direction from a plane defined by a surface through which the first cutout and the second cutout extend.

2. The conductor of claim 1 wherein said at least two deflections are two deflections.

3. The conductor of claim 1 wherein at least two of said at least two deflections have a same height and a same width within 20 percent.

4. The conductor of claim 1 wherein one of said at least two deflections has a deflection width of between 2.5 and 5 times the thickness.

5. The conductor of claim 1 wherein one of said at least two deflections has a deflection height of between 2.5 and 5 times the thickness.

6. The conductor of claim 5 further comprising a minimum intermediate between said one of said at least two deflections and a second deflection, said minimum positioned to be less than the absolute value of the height.

7. The conductor of claim 4 wherein all of said at least two deflections have the width of between 2.5 and 5 times the thickness.

8. The conductor of claim 1 wherein said plurality of joined strips of conductive material are formed of copper or a copper alloy.

9. The conductor of claim 8 wherein said copper or said copper alloys are half hard or spring tempered.

10. The conductor of claim 1 wherein said first cutout is independent of contact with a sheath or a grommet extending therethrough.

11. The conductor of claim 1 further comprising a polymeric insulator enveloping a portion of said at least one strip between the first end and the second end.

12. An electrical conductor comprising plurality of joined strips of conductive material defining a thickness and at least three planar surfaces, a first planar surface having a first end with a first cutout, a second planar surface with a second end having a second cutout, and a third planar surface therebetween, said plurality of joined strips being bent to include at least two sinusoidal deflections orthogonal to one of the at least three planar surfaces, said at least two deflections being in the same direction.

13. The conductor of claim 12 wherein said at least two deflections are a pair of deflections separating said first planar surface from said second planar surface and second pair of deflections separating said second planar surface from said third planar surface.

14. The conductor of claim 12 wherein one of said at least two deflections has a deflection width of between 2.5 and 5 times the thickness.

15. The conductor of claim 12 wherein one of said at least two deflections has a deflection height of between 2.5 and 5 times the thickness.

16. The conductor of claim 12 wherein said plurality of joined strips of conductive material are formed of copper or a copper alloy.

17. The conductor of claim 12 wherein at least two deflections are in a plane defined by a surface through which the first cutout and the second cutout extend.

* * * * *